United States Patent [19]

Akashi et al.

[11] Patent Number: 5,311,241

[45] Date of Patent: May 10, 1994

[54] FOCUS DETECTING APPARATUS DETECTING FOCUS TO A PLURALITY OF AREAS

[75] Inventors: Akira Akashi; Masaki Higashihara, both of Yokohama, Japan

[73] Assignee: Canon Kabushiki Kaisha, Tokyo, Japan

[21] Appl. No.: 994,370

[22] Filed: Dec. 21, 1992

Related U.S. Application Data

[62] Division of Ser. No. 641,508, Jan. 15, 1991, Pat. No. 5,189,465.

[30] Foreign Application Priority Data

Jan. 16, 1990 [JP] Japan .................................... 2-7770

[51] Int. Cl.$^5$ .............................................. G03B 13/36
[52] U.S. Cl. .................................................... 354/402
[58] Field of Search ..................... 354/402, 400, 408

[56] References Cited

U.S. PATENT DOCUMENTS

| | | | |
|---|---|---|---|
| 4,459,006 | 7/1984 | Sakai et al. | 354/402 X |
| 4,534,636 | 8/1985 | Sugawara | 354/403 |
| 4,698,492 | 10/1987 | Ohtaka et al. | 354/407 X |
| 4,768,054 | 8/1988 | Norita et al. | 354/408 |
| 4,801,962 | 1/1989 | Akashi | 354/402 |
| 4,859,842 | 8/1989 | Suda et al. | 354/408 X |
| 4,951,082 | 8/1990 | Takagi | 354/432 |
| 4,963,915 | 10/1990 | Ikemura et al. | 354/432 |
| 4,994,843 | 2/1991 | Kitazawa | 354/409 |
| 5,061,951 | 10/1991 | Higashihara et al. | 354/401 X |
| 5,081,479 | 1/1992 | Kadohara et al. | 354/402 |
| 5,091,742 | 2/1992 | Fukahori et al. | |
| 5,140,359 | 8/1992 | Higashihara et al. | |
| 5,151,732 | 9/1992 | Akashi et al. | |
| 5,227,828 | 7/1993 | Kirigaya | 354/400 |

FOREIGN PATENT DOCUMENTS

2055005 2/1981 United Kingdom .
2223140 3/1990 United Kingdom .

Primary Examiner—W. B. Perkey
Attorney, Agent, or Firm—Fitzpatrick, Cella, Harper & Scinto

[57] ABSTRACT

Focus detecting apparatus detecting focus to a plurality of areas has (1) a first auto-focusing mode in which, regardless of an in-focus or out-of-focus state, an auto-focusing operation (including focus detection and driving of an optical system) are repeatedly performed, and (2) a second auto-focusing mode in which the auto-focusing operation is performed until an in-focus state is obtained and the auto-focusing operation is terminated after the in-focus state is detected. A sensor unit is provided for receiving light beams form a plurality of different areas in a photographic scene. A focus processing circuit is provided for, in the first auto-focusing mode, causing the auto-focusing operation to be performed on the basis of an output of a sensor unit representing a particular area of the plurality of areas as long as the output of said sensor unit which represent the particular area is appropriate. In the second auto-focusing mode, the processing circuit selects as a result of the focus detection operation a signal representing a particular focusing state among the focus state signals of each said area obtained by the focus detection operations performed on outputs of sensor units corresponding to each area of the photographic scene.

6 Claims, 10 Drawing Sheets

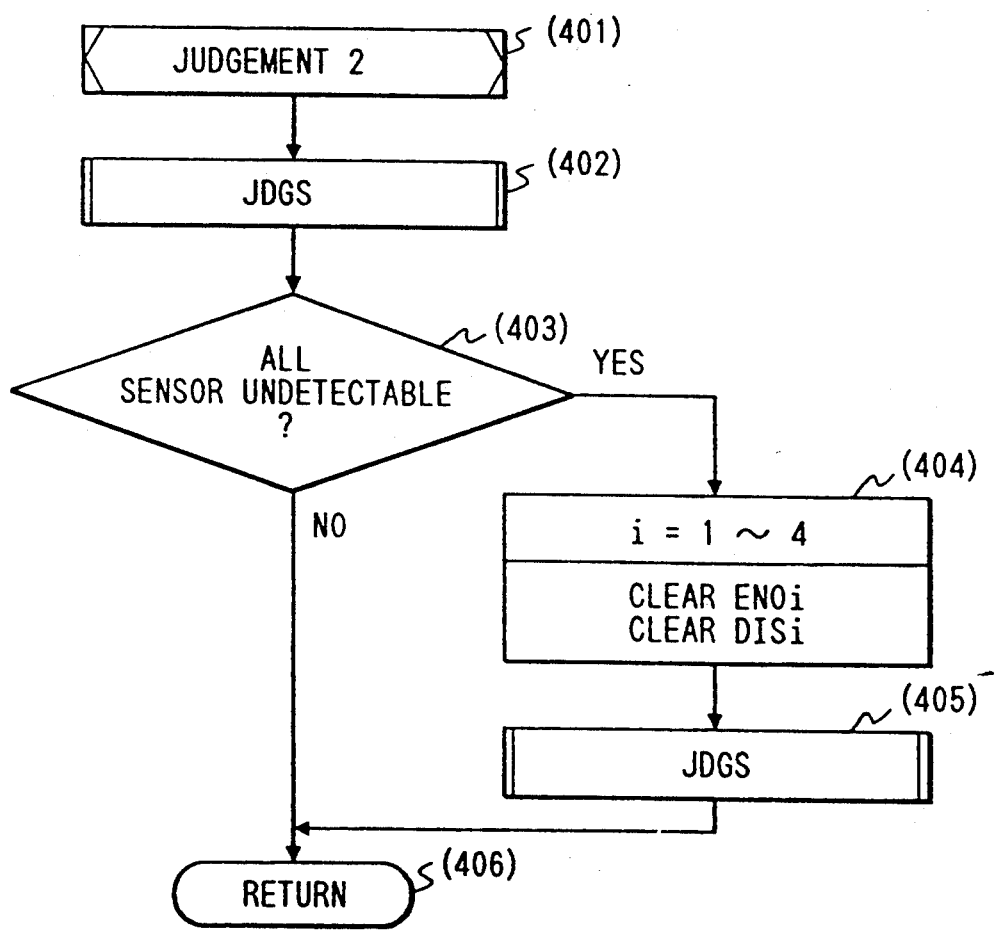

FOCUS DETECTING APPARATUS DETECTING FOCUS TO A PLURALITY OF AREAS

This application is a division of application Ser. No. 07/641,509 filed Jan. 15, 1991, now U.S. Pat. No. 5,189,465.

BACKGROUND OF THE INVENTION

1. Field of the Invention

The present invention relates to an automatic focus control apparatus for detecting defocus amounts of a plurality of object areas within a frame of a photographic lens and, for performing focus control of the photographic lens.

2. Related Background Art

In a conventional focus detection apparatus for a camera, the following method of detecting a defocus amount of an object is known well. Light beams emitted from an object and passing through different exit pupil areas of a photographic lens are focused on a pair of line sensors, and a relative positional displacement between a pair of image signals obtained by photoelectrically converting an object image is obtained, thereby detecting the defocus amount of the object.

In the above method, since a pair of focus detection systems (optical systems and sensors) are used, only a defocus amount in one object area within the frame is detected. However, various methods are proposed wherein a plurality of detection systems are prepared to detect defocus amounts of plural object areas within the frame. In the latter methods, since plural object areas are used, a plurality of defocus amounts are detected. However, when the number of object areas to be focused in a camera is one or two (in the later case, focusing is performed by an intermediate value of the defocus amounts of the two object areas), an object area is selected in accordance with a given technique, and focusing of the photographic lens is performed by the defocus amount of the selected area.

As a method of selecting the object area, an object area judged as an object area nearest to the camera is generally selected.

The above selection method may have the following drawback.

In a single-lens reflex camera, an automatic focus control (AF) method includes a mode (to be referred to as a ONESHOT mode hereinafter) for locking focusing unless a release button is released once an in-focus state is obtained, and a mode (to be referred to as a SERVO mode hereinafter) for always performing focus control regardless of the in-focus or out-of-focus state. The ONESHOT mode is set when a photographer takes pictures of stationary objects, e.g., a portrait or scene. The SERVO mode is set when the photographer takes pictures of moving objects, e.g., a sport game or car race.

In portrait photographing dealing with a person as a main object, when an object area judged to be nearest to the camera is selected as in the above selection method, it is possible to focus on the person as the main object in most cases. However, as for a rapidly moving object as in sport photographing, the main object is usually present at the center of the frame in consideration of framing. When the nearest object area is simply selected, an object which is not the main object, e.g., spectators in a car race, may be undesirably set in an in-focus state.

Another method of selecting one of plural object areas is to select areas except for areas having improper sensor outputs. A typical example is a method of not selecting areas having low contrast levels.

The latter method is effective when sensor outputs are improper due to the low-contrast state. However, improper sensor output values may also be caused by dust attached to the sensors. In this case, a sensor to which dust is attached cannot be non-selected.

In addition, in the method wherein an improper sensor output is not selected to be used, when sensor outputs become improper as outputs for performing focus detection every time focus detection is performed, an unstable AF operation may occur.

SUMMARY OF THE INVENTION

According to one aspect of the present invention, it is an object to provide a focus detection apparatus or an automatic focusing apparatus wherein an algorithm for selecting a predetermined distance measurement area from a plurality of distance measurement areas is changed in accordance with a camera operating state such as an AF mode to select a distance measurement area suitable for each AF mode.

Under the above object, according to one aspect of the application, there is provided a focus detection apparatus or an automatic focusing camera wherein switching between a first mode for performing focus detection of an object within a specific area selected from a plurality of areas within a frame upon selection of the specific area and a second mode for performing focus detection of an area having a predetermined focus state within the frame upon selection of the area having the predetermined focus state is performed in accordance with a camera operating state such as an AF mode.

Under the above object, according to another aspect of the present invention, there is provided an automatic focus control apparatus wherein a nearest object area is selected in a ONESHOT mode, and an object area at the center of the frame is selected in a SERVO mode.

According to a further aspect of the present invention, there is provided a focus detection apparatus or an automatic focusing camera, wherein when a defocus amount based on an output from an AF sensor falls within a predetermined range, the defocus amount based on this sensor output is regarded to be improper, and the sensor output is set to be non-selective.

Under the above object, according to yet another aspect of the present invention, there is provided a focus detection apparatus or an automatic focusing apparatus, wherein when defocus amounts falling within the predetermined range are continuously detected as defocus amounts based on sensor outputs upon repeated focus detection, these sensor outputs are regarded to be improper and non-selective.

According to yet another aspect of the present invention, there is provided a focus detection apparatus or an automatic focusing camera, wherein when sensor outputs obtained upon repeated focus detection represent proper and improper outputs and even if a subsequent sensor output is a proper output, this sensor output is regarded to be non-selective, thereby stabilizing automatic focusing.

The above and other objects, features, and advantages of the present invention will be described with reference to a preferred embodiment in conjunction with the accompanying drawings.

BRIEF DESCRIPTION OF THE DRAWINGS

FIGS. 4A to 4G are flow charts for explaining the operations of the camera shown in FIG. 2.

DETAILED DESCRIPTION OF THE PREFERRED EMBODIMENT

The present invention will be described in detail with reference to an illustrated embodiment.

Figure 1:
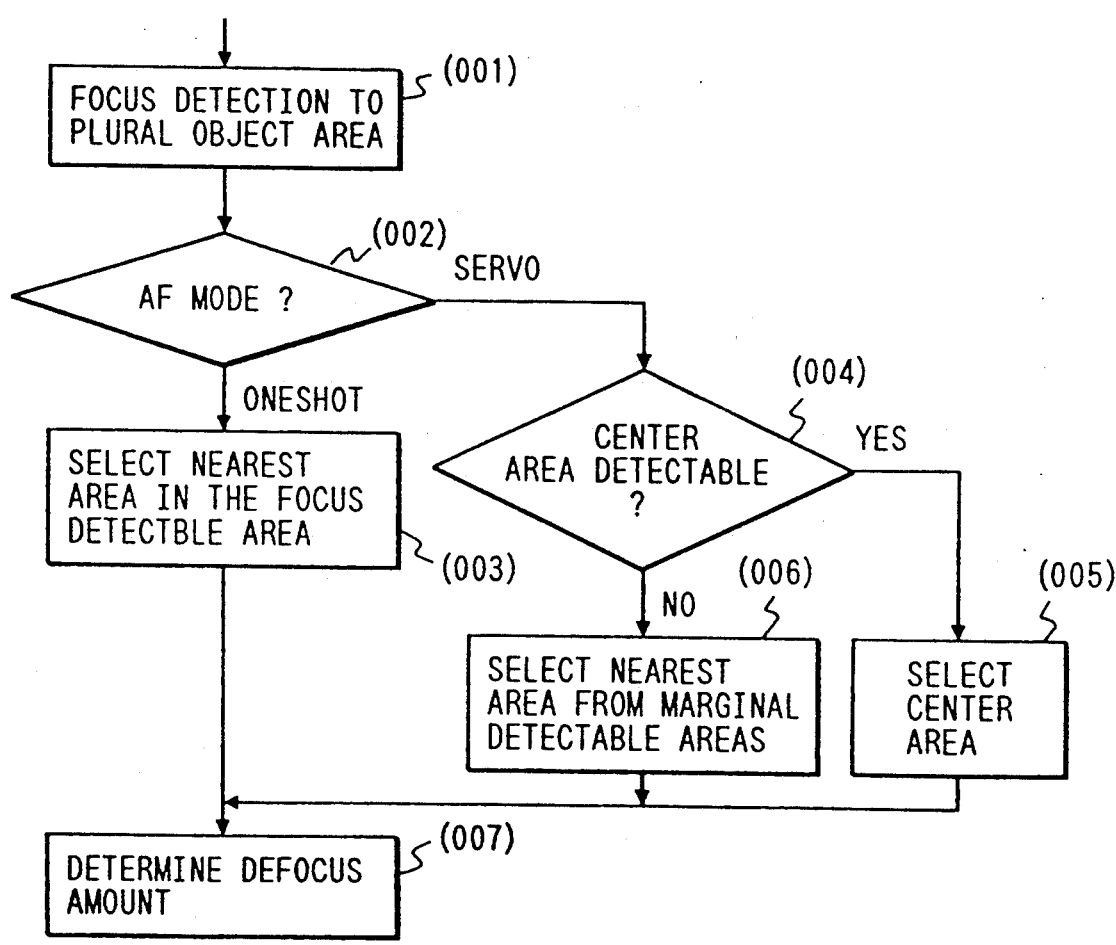
FIG. 1 is a flow chart for explaining an operation of a main part of a focus detection apparatus according to the present invention.

FIG. 1 is a flow chart schematically showing an embodiment of the present invention.

In step (001), focus detection to plural object areas is performed to detect defocus amounts of the respective areas.

It is determined in step (002) whether an automatic focusing (AF) mode is the ONESHOT mode or SERVO mode. When the ONESHOT mode is determined, the flow advances to step (003).

In step (003), an area falling within the focus detectable area and having a defocus amount corresponding to the nearest distance, i.e., the nearest area in the focus detectable area, is selected from a plurality of areas.

When the AF mode is determined to be the SERVO mode in step (002), the flow advances to step (004).

It is determined in step (004) whether the center area of the plurality of object areas is detectable. If YES in step (004), the flow advances to step (005), and the center area is selected in step (005). If NO in step (004), the flow advances to step (006) to select the nearest area from marginal detectable areas.

After area selection in steps (003), (005), and (006) is completed, the defocus amount of the selected area is defined as a final defocus amount in step (007). The photographic lens is driven on the basis of the final defocus amount.

As described above, when the AF mode is the ONESHOT mode, the nearest object within the frame is focused. However, in the SERVO mode, the center object within the frame is focused. Therefore, the main object suitable for the present photographic scene is selected.

In an embodiment to be described later, detection of a defocus amount as a focusing state is performed as focus detection. However, an object distance may be obtained as a focusing state of each area in place of the defocus amount.

Figure 3:
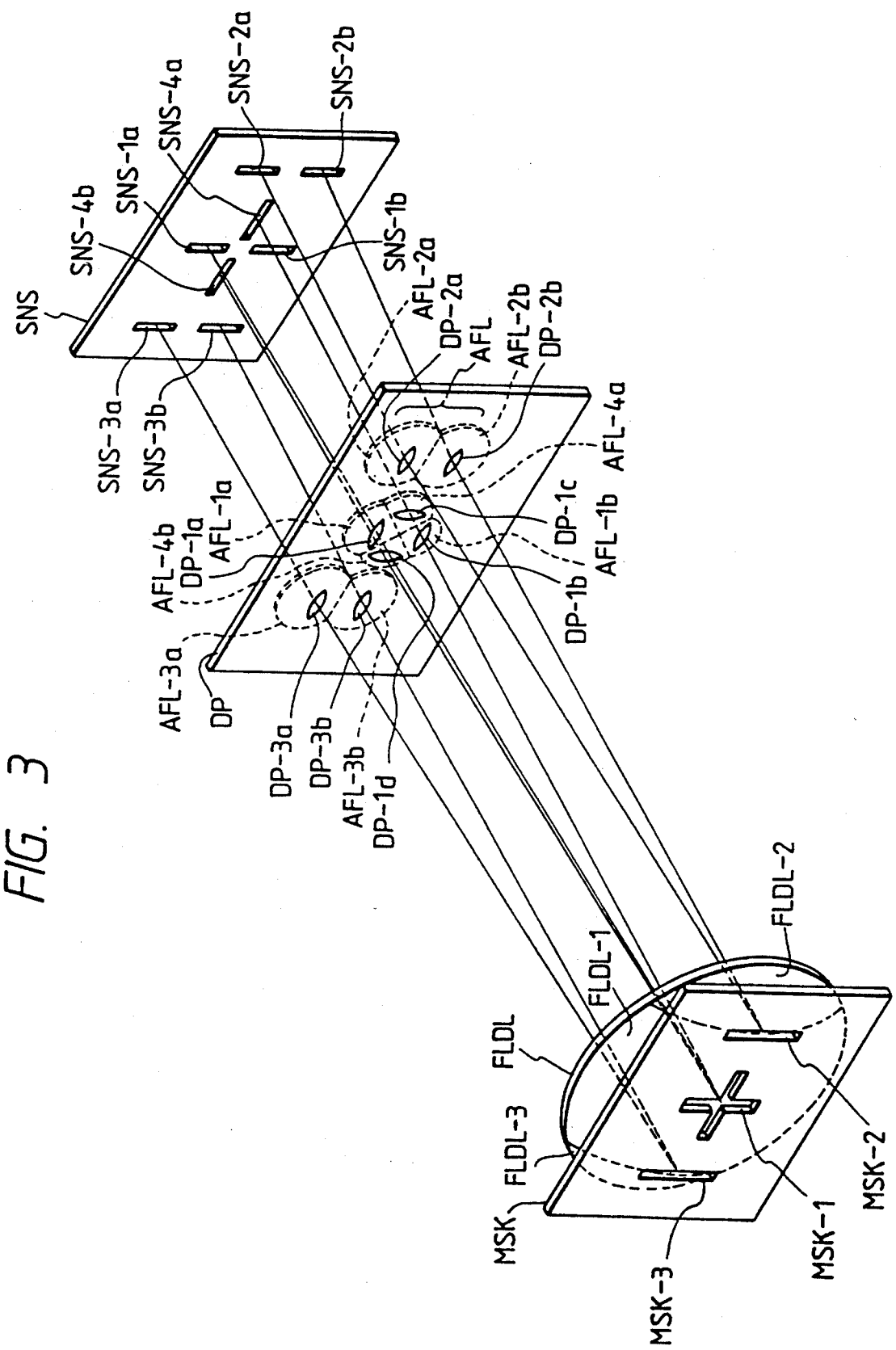
FIG. 3 is an exploded perspective view showing a detailed arrangement of a focus detection system of the camera shown in FIG. 2.

FIG. 3 is a view schematically showing a focus detection apparatus according to the embodiment of the present invention.

A field view mask MSK has a cross-shaped central opening MSK-1 and vertically elongated end openings MSK-2 and MSK-3. A field lens FLDL comprises three portions FLDL-1, FLDL-2, and FLDL-3 respectively corresponding to three openings MSK-1, MSK-2, and MSK-3 of the field view mask MSK. A diaphragm DP consists of: four central openings, i.e, pairs of openings DP-1a and DP-1b and openings DP-1c and DP-1d; a pair of right openings DP-2a and DP-2b; and a pair of left openings DP-3a and DP-3b. The areas FLDL-1, FLDL-2, and FLDL-3 of the field lens FLDL have functions of respectively focusing the opening pairs DP-1, DP-2, and DP-3 near an exit pupil of an objective lens (not shown). A secondary focusing lens AFL consists of four pairs, i.e., eight lenses AFL-1a, AFL-1b, AFL-4a, AFL-4b, AFL-2a, AFL-2b, AFL-3a, and AFL-3b. These lenses are located behind the diaphragm DP at positions respectively corresponding to the openings. A sensor SNS comprises four pairs, i.e., eight sensor arrays SNS-1a, SNS-1b, SNS-4a, SNS-4b, SNS-2a, SNS-2b, SNS-3a, and SNS-3b. The sensor arrays respectively correspond to the secondary focusing lenses AFL to receive images.

In the focus detection system shown in FIG. 3, when a focal point of the photographic lens is located in front of a film surface, object images formed on the respective sensor arrays are close to each other. However, when the focal point of the photographic lens is located behind the film surface, object images formed on the respective sensor arrays are separated from each other. Relative positional displacements of these object images have a predetermined relationship with defocus amounts of the photographic lens. When an appropriate arithmetic operation is performed for a sensor output pair from each sensor array pair, an out-of-focus amount of the photographic lens, i.e., a defocus amount, can be detected.

With the above arrangement, near the center of the photographic or observing range of an objective lens (not shown), a distance to an object whose light amount distribution is changed in one vertical or horizontal direction can be measured. A distance to an object located at a position corresponding to the peripheral opening MSK-2 or MSK-3 except for the central openings of the field view mask can also be measured.

Figure 2:
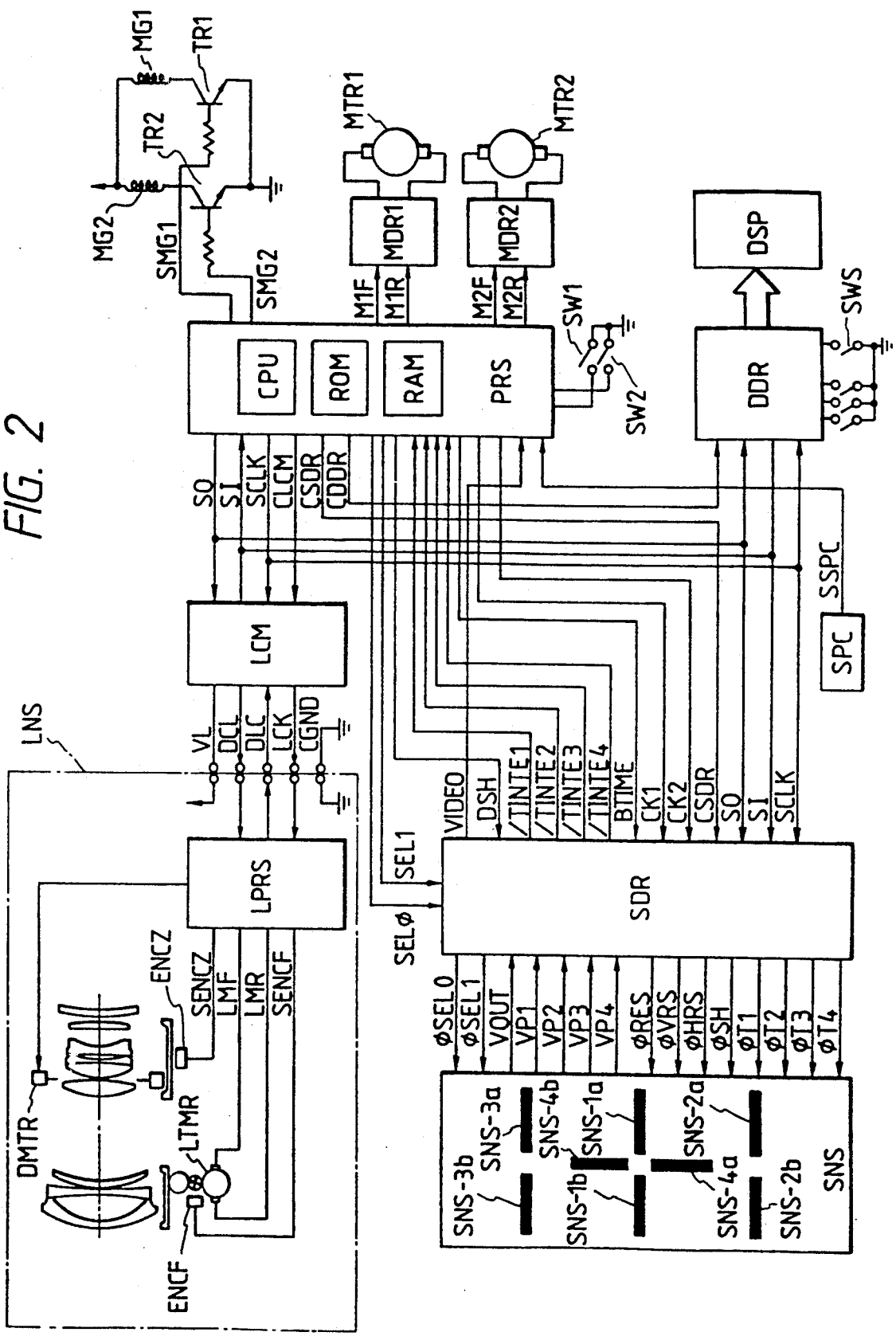
FIG. 2 is a diagram showing a circuit arrangement of a camera to which the focus detection apparatus of the present invention is applied.

FIG. 2 is a diagram showing a circuit arrangement of a camera having the focus detection apparatus shown in FIG. 3, and the respective components will be described below.

Referring to FIG. 2, a camera controller PRS comprises a one-chip microcomputer including CPU (Central Processing Unit), ROM, RAM, and A/D conversion functions. The microcomputer PRS performs a series of camera operations such as an automatic exposure control function, an automatic focus control function and film winding/rewinding in accordance with a camera sequence program stored in the ROM. For this purpose, the microcomputer PRS communicates with peripheral circuits in the camera body and a controller in a lens to control the respective circuits and lens operations by using communication signals SO, SI, SCLK, and lo communication selection signals CLCM, CSDR, and CDDR.

The communication signal SO is a data signal output from the microcomputer PRS. The communication signal SI is a data signal input to the microcomputer PRS. The communication signal SCLK is a sync clock signal for the data signals SO and SI.

A lens communication buffer circuit LCM supplies a power to a lens power source terminal VL during an operation of the camera and serves as a communication buffer between the camera and the lens when the selection signal CLCM from the microcomputer PRS is set at a high-potential level (to be referred to as an H level, whereas a low-potential level is referred to as an L level hereinafter).

When the microcomputer PRS sets the selection signal CLCM at H level and outputs predetermined data as the signal So in synchronism with the sync clock SCLK, the buffer circuit LCM outputs the signals SCLK and SO as buffer signals LCK and DCL through communication contacts between the camera and the lens. At the same time, a buffer signal of the signal DLC from the lens LNS is output as the signal SI. The microcomputer PRS inputs the signal SI as the lens data in synchronism with the sync clock SCLK.

A switch detection/display circuit DDR is selected when a signal CDDR is set at H level and is controlled by the microcomputer PRS by using the signals SO, SI, and SCLK. That is, on the basis of data sent from the microcomputer PRS, a display state of a camera display member DSP is changed. The ONIOFF state of each operation member of the camera is signaled to the microcomputer PRS.

The automatic focusing (AF) mode of the camera is set by detecting states of switches SWS through the switch detection circuit DDR under the control of the microcomputer PRS. More specifically, when a specific one of the switches SWS is set in an ON state, the ONE-SHOT mode is set (i.e., once an in-focus state is set, the focusing state is locked). However, when the specific switch is turned off, the SERVO mode is set (i.e., focus control is performed regardless of an in-focus or out-of-focus state).

Switches SW1 and SW2 are interlocked with a release button (not shown). Upon depression of the release button to the first step, the switch SW1 is turned on. Upon depression of the release button to the second step, the switch SW2 is turned on. The microprocessor PRS performs photometric and automatic focusing operations in the ON state of the switch SW1. The microcomputer PRS then performs exposure control and the subsequent film winding operation by triggering the SW2.

The switch SW2 is connected to an "interrupt input terminal" of the microcomputer PRS. Even if a program is running upon ON the operation of the switch SW1, the switch SW2 is turned on to generate an interrupt, so that the main routine immediately transits to a predetermined interrupt program.

A film feed motor MTRL and a mirror up/down and shutter spring char e motor MTR2 are rotated in the forward/reverse directions by drivers MDR1 and MDR2, respectively. Signals M1F, M1R, M2F, and M2R input from the microcomputer PRS to the drivers MDR1 and MDR2 are motor control signals.

Shutter front and rear curtain start magnets MG1 and MG2 are energized by signals SMG1 and SMG2 and gain transistors TR1 and TR2, and shutter control is performed by the microcomputer PRS.

The switch detection/display circuit DDR, the motor drivers MDR1 and MDR2, and shutter control are not directly associated with the present invention, and a detailed description thereof will be omitted.

A control circuit LPRS is arranged in the lens. A signal DCL input in synchronism with the control circuit LPRS is instruction data from the camera to the photographic lens LNS. A lens operation in response to this instruction data is predetermined. The control circuit LPRS analyzes the instruction in accordance with a predetermined sequence, controls focusing and the diaphragm, and outputs an operating state (e.g., a drive state of a focus control optical system and a drive state of the diaphragm) of each component of the lens and various parameters (an open f-number, a focal length, and a coefficient of a movement amount of a focus control optical system for a defocus amount) from the output DLC.

This embodiment exemplifies a zoom lens as the photographic lens. When a focus control instruction is sent from the camera, a focus control motor LTMR is driven by signals LMF and LMR to move the focus control optical system in the direction of the optical axis, thereby performing focus control, in accordance with a drive amount and a drive direction which are sent together with the focus control instruction. A moving amount of the optical system is detected by a photocoupler so that a pattern of a pulse plate rotated in synchronism with the optical system is detected. An encoder ENCF for outputting pulses corresponding to the moving amount monitors a pulse signal SENCF, and the pulses are counted by a counter in the control circuit LPRS. When the count value from the counter coincides with the moving amount sent from the control circuit LPRS, the control circuit LPRS sets the signals LMF and LMR at L level, thereby controlling the motor LMTR.

For this reason, once the focus control instruction is sent from the camera, the microcomputer PRS serving as the camera controller need not control lens driving until lens driving is completed. When a request is sent from the camera, it is possible to send the content of the counter to the camera.

When a diaphragm control instruction is sent from the camera, a known stepping motor DMTR is driven as a diaphragm drive motor in accordance with a stop-down count sent together with the diaphragm control instruction. Since the stepping motor is controlled in accordance with an open loop, it does not require any encoder.

An encoder ENCZ is attached to a zoom optical system. The control circuit LPRS receives a signal SENCZ from the encoder ENCZ and detects a zoom position. Lens parameters corresponding to the respective zoom positions are stored in the control circuit LPRS. When a request is sent from the camera microcomputer PRS, a parameter corresponding to the present zoom position is sent to the camera.

A photometric sensor SPC for exposure control receives light from an object through the photographic lens. An output SSPC from the photometric sensor SPC is input to the analog input terminal of the microcomputer PRS. After the analog signal is converted into a digital signal, the digital signal is used for automatic exposure control in accordance with a predetermined program.

A driver SDR drives a focus detection line sensor SNS. The driver SDR is selected when a signal CSDR is set at H level, and is controlled using the signals SO, SI, and SCLK by the microcomputer PRS.

Signals $\phi$SEL0 and $\phi$SEL1 sent from the driver SDR to the sensor SNS are signals SEL0 and SEL1 from the microcomputer PRS. If $\phi$SEL0="L" and $\phi$SEL1="L", then the sensor array pair SNS-1 (SNS-1a and SNS-1b) is selected. If $\phi$SEL0="H" and $\phi$SEL1="L", then the sensor array pair SNS-4 (SNS-4a and SNS-4b) is selected. If $\phi$SEL0="L" and $\phi$SEL1="H", then the sensor array pair SNS-2 (SNS-2a and SNS-2b) is selected. If $\phi$SEL0="H" and SEL1="H", then the sensor array pair SNS-3 (SNS-3a and SNS-3b) is selected.

Upon completion of storage, the signals SEL0 and SEL1 are properly set to send clocks $\phi$SH and $\phi$HRS, and image signals from the sensor array pair selected by the signals SEL0 and SEL1 ($\phi$SEL0 and $\phi$SEL1) are sequentially output from an output VOUT.

Monitor signals Vp1, VP2, VP3, and VP4 are output from object brightness monitor sensors (not shown) located near the sensor array pairs SNS-1 (SNS-1a and SNS-1b), SNS-2 (SNS-2a and SNS-2b), SNS-3 (SNS-3a and SNS-3b), and SNS-4 (SNS-4a and SNS-4b), respectively. When storage is started, voltages of the monitor signals VP1, VP2, VP3, and VP4 are increased, so that storage control of the respective sensor arrays is performed.

Signals $\phi$RES and $\phi$VRS serve as reset signals for the sensor. Signals $\phi$HRS and $\phi$SH serve as image signal read clocks. Signals $\phi$T1, $\phi$T2, $\phi$T3, and $\phi$T4 are clocks for terminating storage of the respective sensor array pairs.

An output VIDEO from the sensor driver SDR is an image signal obtained by calculating a difference between an image signal VOUT from the sensor SNS and a dark current output and by amplifying the difference with a gain determined by the brightness of the object. The dark current output represents an output value of pixels shielded in the sensor array. The driver SDR causes a capacitor to store an output by a signal DSH from the microcomputer PRS and amplifies a difference between the output and the image signal. The output VIDEO is input to the analog input terminal of the microcomputer PRS. The microcomputer PRS converts this analog signal into a digital signal and sequentially stores the digital signals at predetermined addresses of the RAM.

Signals /TINTE1, /TINTE2, /TINTE3, and /TINTE4 represent that charges stored in the sensor array pairs SNS-1 (SNS-1a and SNS-1b), SNS-2 (SNS-2a and SNS-2b), SNS-3 (SNS-3a and SNS-3b), and SNS-4 (SNS-4a and SNS-4b) are optimal and storage is completed. Upon reception of these signals, the microcomputer PRS performs read access of the image signal.

A signal BTIME is a signal for defining a gain determination timing of the image signal gain amplifier. When the signal BTIME is set at H level, the driver SDR determines a read gain of the corresponding sensor array pair from the monitor signals VP0 to VP3.

Reference clocks CK1 and CK2 are supplied from the microcomputer PRS to the sensor driver SDR to generate the clocks $\phi$RES, $\phi$VRS, $\phi$HRS, and $\phi$SH.

The microcomputer PRS sets the communication selection signal CSDR at H level and sends a "storage start command" to the sensor driver SDR to start storage of the sensor SNS.

Object images formed on the sensors of the four sensor array pairs are photoelectrically converted, so that charges are stored in the photoelectric conversion element unit. At the same time, voltages of the signals VP1 to VP4 for the brightness monitor sensor of the sensors are increased. When the voltages reach predetermined levels, the sensor driver SDR independently sets the signals /TINTE1 to /TINTE4 at L level.

Upon reception of these signals, the microcomputer PRS outputs a predetermined waveform to the clock CK2. The sensor driver SDR supplies the clocks $\phi$SH and $\phi$HRS to the sensor SNS on the basis of the clock CK2, and the sensor SNS outputs image signals in response to the above clocks. The microcomputer PRS converts the output VIDEO input to its analog input terminal in accordance with its A/D conversion function in synchronism with the clock CK2 output thereby.

The digital signals are then sequentially stored at predetermined addresses of the RAM.

Since the operations of the sensor driver SDR and the sensor SNS are disclosed as a focus detection apparatus having two pairs of sensor arrays by the present assignee in Japanese Laid-Open Patent Application No. 63-216905, a detailed description thereof will be omitted.

As described above, the microcomputer PRS receives image information of the object images formed on the sensor arrays and performs predetermined focus detection operations, thereby detecting a defocus amount of the photographic lens.

The automatic focus control apparatus of the camera having the above arrangement will be described with reference to the flow charts.

Figure 4A:
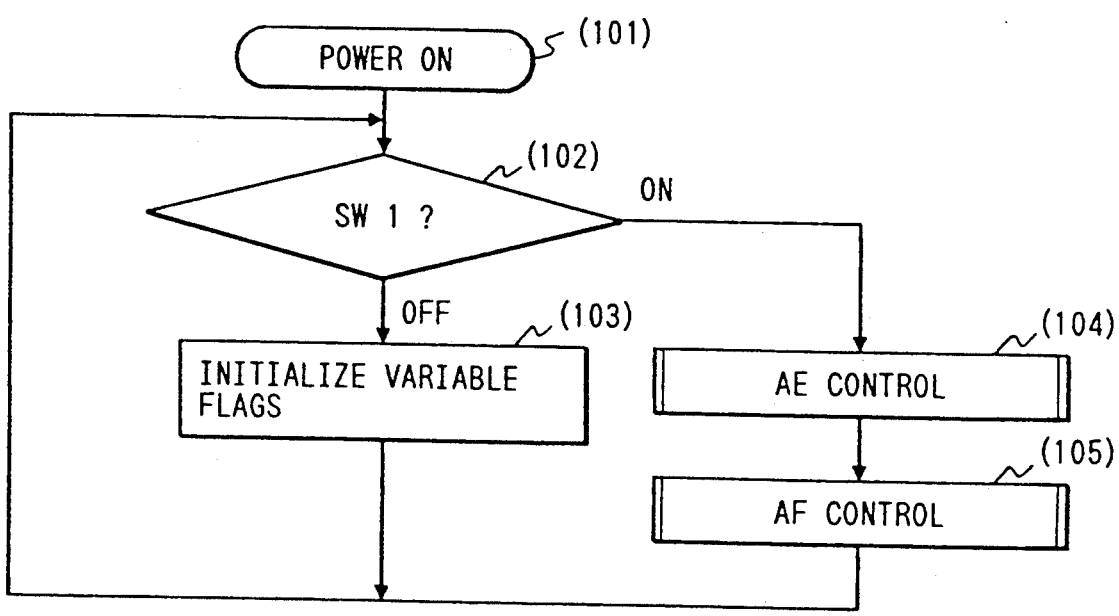

FIG. 4A is a flow chart showing an overall sequence of the camera.

When a power is supplied to the circuit shown in FIG. 2, the microcomputer PRS starts the operation in step (101) of FIG. 4A. In step (102), an operating state of the switch SW1 turned on upon depression of the release switch to the first step is detected. If the OFF state of the switch SW1 is detected, the flow advances to step (103), and variable flags are initialized. However, when the ON state of the switch SW1 is detected, the flow advances to step (104) and the operation of the camera is started.

In step (104), an "AE control" subroutine such as a photometric operation and detection of states of various switches and displays is executed. Since the AE control is not directly associated with the present invention, a detailed description thereof will be omitted. When the subroutine "AE control" is completed, the flow advances to step (105).

An "AF control" subroutine is executed in step (105). Storage and focus detection operations and automatic focus control operations for driving the lens are performed. When the subroutine "AF control" is completed, the flow returns to step (102), and the operations in steps (104) and (105) are repeated until the apparatus is powered off.

Although the flow chart of this embodiment does not describe the release operation, the release operation is not directly associated with the release operation, and a detailed description thereof will be omitted.

Figure 4B:
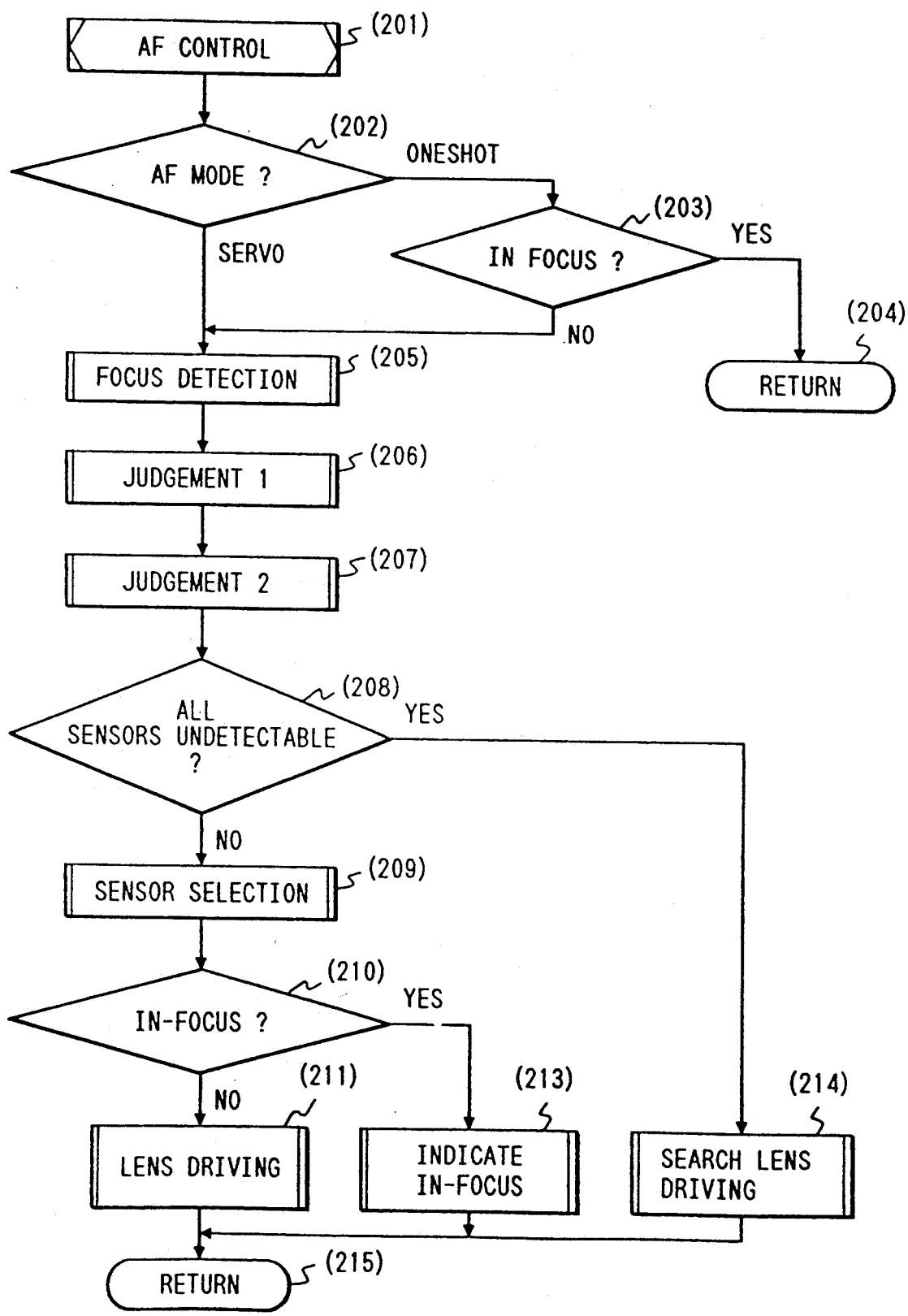

FIG. 4B is a flow chart of the subroutine "AF control" executed in step (105).

When the subroutine "AF control" is called, AF control from step (202) is executed through step (201).

It is determined in step (202) whether the AF mode is the ONESHOT or SERVO mode. If the ONESHOT mode is determined, the flow advances to step (203).

It is determined in step (203) whether the previous focus detection result represents an in-focus state. If YES in step (203), the subroutine "AF control" is returned in step (204) without performing a new focus control operation.

However, when it is determined in step (203) that the in-focus state is not detected, or when the AF mode is the SERVO mode in step (202), the flow advances to step (205) to perform a new focus control operation.

In step (205), a subroutine "focus detection" for detecting a defocus amount of each of the plurality of object areas is executed. A detailed focus detection method is described in Japanese Patent, Application No. 1-291130 filed by the present assignee, and a detailed description thereof will be omitted.

Defocus amounts are detected in four object areas in the embodiment of the present invention. More specifically, defocus amounts DEF1, DEF2, DEF3, and DEF4 are obtained from the object areas, respectively. A focus detectable or undetectable state is determined by a known method in accordance with an image signal contrast level and the like.

A subroutine "judgement 1" is determined in the next step (206). The "judgement 1" is a subroutine for eliminating a detection result caused by dust present in a focus detection system (an optical system and a sensor).

Figure 4C:
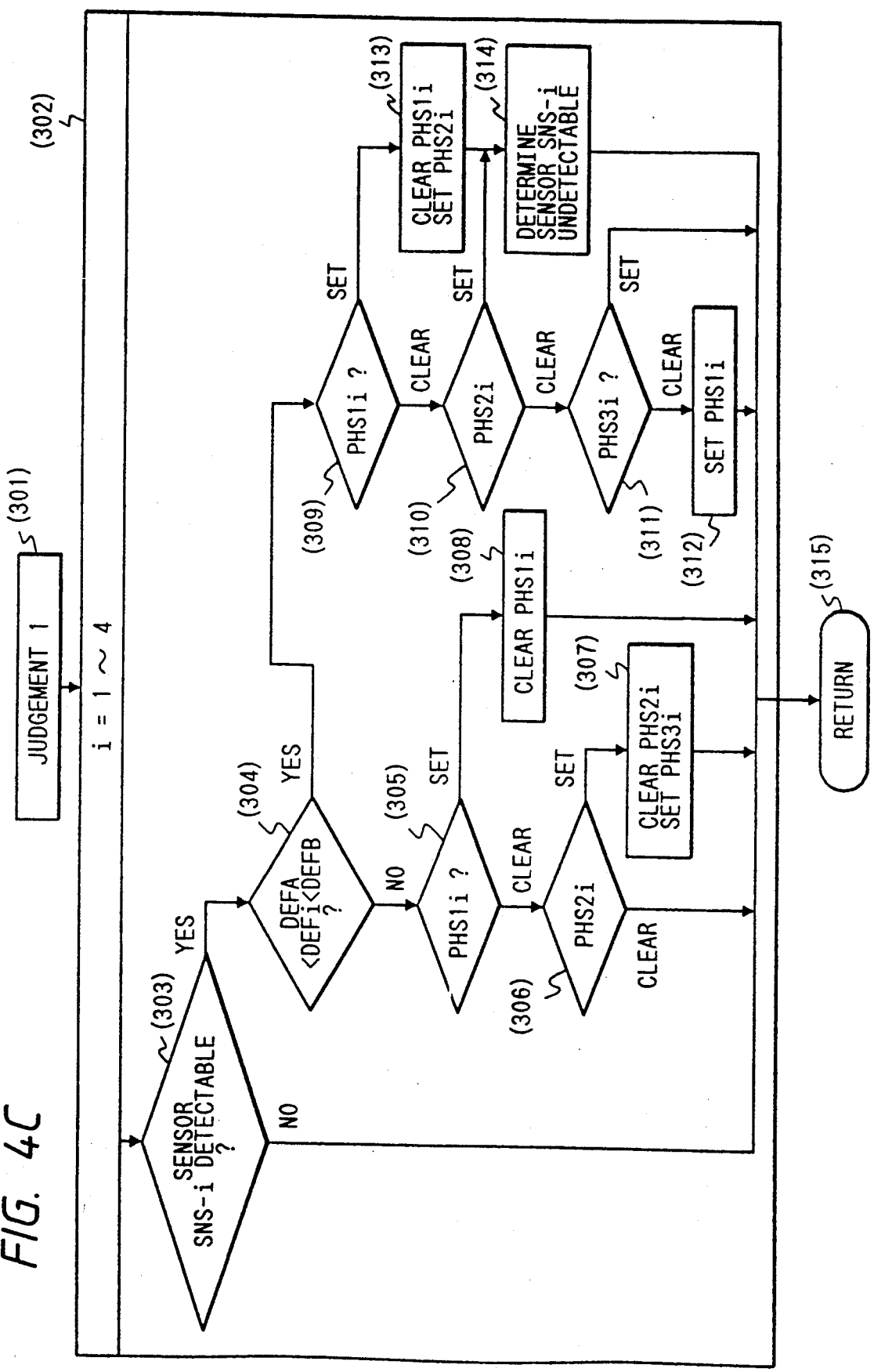

The flow chart of the "judgement 1" is shown in FIG. 4C.

When the "judgement 1" subroutine is called, the flow advances to step (302) through step (301) in FIG. 4C.

Step (302) represents loop processing for performing operations for each of the four object areas. Processing is performed while a variable i representing the area is changed from 1 to 4.

First, the variable i is set to 1, and the flow advances to step (303).

In step (303), it is determined whether focus detection of the sensor SNS-i, i.e., the first object area corresponding to the sensor SNS-1 is possible. If YES in step (303), the flow advances to step (304). If NO in step (303), the loop for i=1 is ended, the variable i is set to 2, and the processing from step (303) is started again.

If focus detection is possible, the flow advances to step (304). In this case, it is determined whether a defocus amount DEFI, i.e., the defocus amount DEF1 of the first object area falls within a predetermined defocus range of DEFA to DEFB. DEFA and DEFB are values determined by an arrangement of a focus detection system (i.e., the optical system and the sensor). If dust is attached to the focus detection optical system, and a dust image is detected by the sensor, a predetermined defocus amount is detected. When the detected defocus amount falls within the range of DEFA to DEFB, a defocus amount may be the one caused by dust.

Flags used in the processing loop (302) will be described below.

PHS1i Flag

This flag represents detection of a defocus amount within the range of DEFA to DEFB in the object area i once.

PHS2i Flag

This flag represents detection of a defocus amount within the range of DEFA to DEFB in the object area i twice. In this case, the defocus amount is regarded to be caused by dust, and the corresponding area i is regarded to be undetectable.

PHS3i Flag

This flag represents the following. The defocus amount within the range of DEFA to DEFB in the object area i is detected twice and the defocus amount is determined to be undetectable. However, since a defocus amount falling outside the range of DEFA to DEFB is detected subsequently, a defocus amount falling within the range of DEFA to DEFB is not determined to be undetectable thereafter.

In step (304), if the defocus amount DEFT of the object area 1 falls within the range of DEFA to DEFB, the flow advances to step (309).

In step (309), the flag PHSli, i.e, the flag PHS11 is determined. If it is already set, the flow advances to step (313).

In step (313), since the defocus amount falling within the range of DEFA to DEFB is detected twice, the flag PHS11 is cleared, and the PHS21 flag is then set. In step (314), the sensor SNS-I, i.e., the object area 1 is determined to be undetectable, thereby completing loop processing for the area 1.

If the PHS11 flag is cleared in step (309), the flow advances to step (310) to determine the flag PHS2i.

If the flag PHS2i, i.e., the PHS21 flag is set in step (310), the flow advances to step (314), and the focal point of the object area 1 is determined to be undetectable. When the PHS21 flag is cleared, the flow advances to step (311) to determine the flag PHS3i.

If the flag PHS3i, i.e., the PHS31 flag is set in step (311), the area is not determined to be undetectable, so that the flow is branched into loop processing (step (302)) for the object area 1.

If the PHS31 flag is cleared in step (311), a defocus amount of the area 1 falls within the range of DEFA to DEFB for the first time, and the flow advances to step (312). In step (312), the PHS11 flag is set to complete loop processing.

The flow returns to step (304). If the detected defocus amount of the object area 1 does not fall within the range of DEFA to DEFB, the flow advances to step (305).

The flag PHS1i, i.e., the PHS11 flag is determined in step (305). If this flag is set, the PHS11 flag is cleared in step (308) to complete loop processing for the area 1.

If the PHS11 flag is cleared in step (305), the PHS2i flag, i.e., the PHS21 flag is determined in step (306). If this flag is cleared, loop processing for the area 1 is completed. Otherwise, as described above, in order not to determine subsequent defocus amounts in the area 1 to be undetectable or even if they fall within the range of DEFA to DEFB, the flow advances to step (307). The PHS21 flag is cleared, and the PHS31 flag is set, thereby completing loop processing for the area 1.

When loop processing for the area 1 is completed, the flow returns to step (302), and the variable i is set to 2. The same loop processing as described above is performed for the object area 2. When processing for the area 2 is completed, the same processing as described is performed for the areas 3 and 4.

When all loop operations for the object areas 1 to 4 are completed, the flow advances to step (315), the subroutine "judgement 1" is ended, and the flow returns to the main routine.

The operations of the "judgement 1" subroutine are summarized as follows. It is determined whether a detected defocus amount falls within a predetermined defocus range in units of object areas. If the detected defocus amount falls within this range twice, this amount is caused by dust within the focus detection system, and the corresponding area is determined to be undetectable. If a defocus amount is detected to fall outside the predetermined range after this amount falls within the predetermined range twice, no subsequent defocus amount falling within the predetermined range is determined not to be undetectable.

Referring back to FIG. 4B, a description of the flow chart will be continued.

When the "judgement 1" subroutine is completed in step (206), the "judgement 2" subroutine is executed in step (207).

The "judgement 2" subroutine is a routine for preventing lens driving from an oscillation state due to a focus detectable or undetectable state upon driving of the photographic lens in an automatic focus control apparatus for performing focus control of the photographic lens from the focus detection results of the plurality of object areas.

Figure 4E:
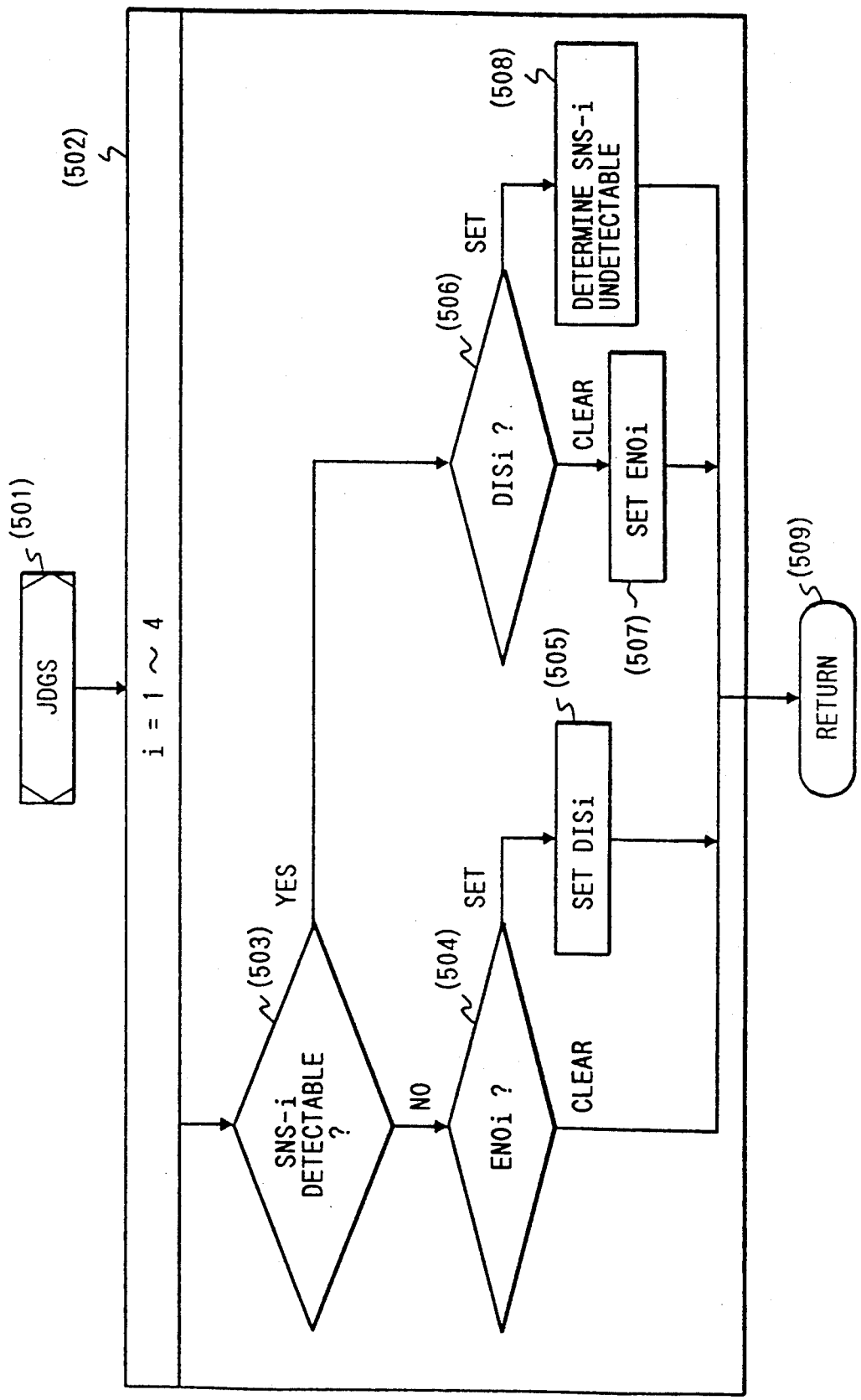

The "judgement 2" subroutine is shown in flow charts of FIGS. 4D and 4E.

When the "judgement 2" subroutine is called, operations from step (402) through step (401) of FIG. 4D are performed.

In step (402), the "JDGS" subroutine is executed.

The "JDGS" subroutine is a subroutine wherein when a given object area is determined to be detectable and then undetectable, even if the given object area is determined to be detectable again, the area is kept undetectable unless the release button is released.

When the "JDGS" subroutine is called, loop processing of step (502) is executed through step (501) of FIG. 4E.

Step (502) represents loop processing for performing the same operations as in step (302) in units of object areas. Processing is repeated while the variable i is updated from 1 to 4.

First, the variable i is set to 1, and step (503) is executed.

It is determined in step (503) whether focus detection of the sensor SNS-i, i.e., an object area corresponding to the sensor SNS-1 is possible. If YES in step (503), the flow advances to step (506).

Flags used in the loop processing of step (502) will be described below:

ENOi

This flag represents that focus detection of the object area i is temporarily possible.

DISi

This flag represents that the object area i becomes undetectable after its focus detection is temporarily possible. Thereafter, even if this area is detectable, it is determined to be undetectable.

When a distance measurement point whose focus detection is once possible becomes undetectable, this point is determined to be undetectable even if it becomes detectable again. Upon driving of the photographic lens, the selection area is changed, so that the oscillation state is prevented.

Since the DISI flag, i.e., DIS1 flag since the variable i is set to 1, is set in step (506), the flow advances to step (508), and the object area 1 corresponding to the SNS-1 is determined to be undetectable, thereby completing loop processing for the area 1.

If the DIS1 flag is cleared in step (506), the flow advances to step (507). The focus detection of the object area 1 becomes temporarily possible, and the EN01 flag is set. The loop processing for the area 1 is completed.

If the focus detection of the object area 1 corresponding to the sensor SNS-1 is not possible in step (503), the flow advances to step (504).

If the ENOi flag, i.e., the EN01 flag is set in step (504), the flow advances to step (505). Since it is determined that the object area 1 becomes undetectable after focus detection of the object area 1 is once possible, the DIS1 flag is set. Loop processing for the object area 1 is completed.

If the EN01 flag is kept cleared in step (504), loop processing for the area 1 is completed without performing any operation.

When loop processing of the object area 1 is completed, the variable i is changed in an order of 2, 3, and 4.

When the loop processing for all the object areas is completed, the flow advances to step (509), the "JDGS" subroutine is ended, and the flow returns to the main routine.

When the "JDGS" subroutine is completed, the flow returns to the flow chart of FIG. 4D, and the flow advances to step (403).

It is determined in step (403) whether all the sensors (areas) are undetectable in accordance with the execution result of the "JDGS" subroutine executed in step (402). If YES in step (403), the flow advances to step (404). After all the ENOi and DISi flags are cleared, the "JDGS" subroutine is executed again in step (405). When focus detection of all the areas becomes impossible upon execution of the "JDGS" in step (402), focus detection may have become impossible since all the areas are truly undetectable in the present focus detection operation, or focus detection may have become impossible due to the state of the flag DISi. The "JDGS" subroutine aims at suppressing an unnecessary oscillation operation of the photographic lens caused by changing the selection object area in accordance with a focus detectable or undetectable state. If focus detection of all the areas is determined to be impossible although a focus detectable object area is present, this operation is entirely different from the true purpose of focus detection. Therefore, flags for functioning the "JDGS" subroutine are temporarily cleared in step (404), and the "JDGS" subroutine is executed in step (405).

When all the object areas are not undetectable in step (403), or the "JDGS" subroutine is executed in step (405), the flow advances to step (406). The "judgement 2" subroutine is ended, and the flow returns to the main routine.

When execution of the "judgement 2" subroutine is completed, the flow transits to step (208) in the flow chart of FIG. 4B.

The flow chart of FIG. 4B will be described again.

It is determined in step (208) whether all the sensors, i.e., all the object areas are undetectable. If YES in step (208), the flow advances to step (214), and the "search lens driving" subroutine is performed. When the contrast of the object is low, and focus detection is impossible, focus detection is executed while the photographic lens is driven. This control is disclosed in Japanese Patent Application No. 61-160824, and a detailed description thereof will be omitted.

When all the object areas are not determined to be undetectable in step (208), the flow advances to step (209), and the "sensor select" subroutine is executed.

Figure 4F:
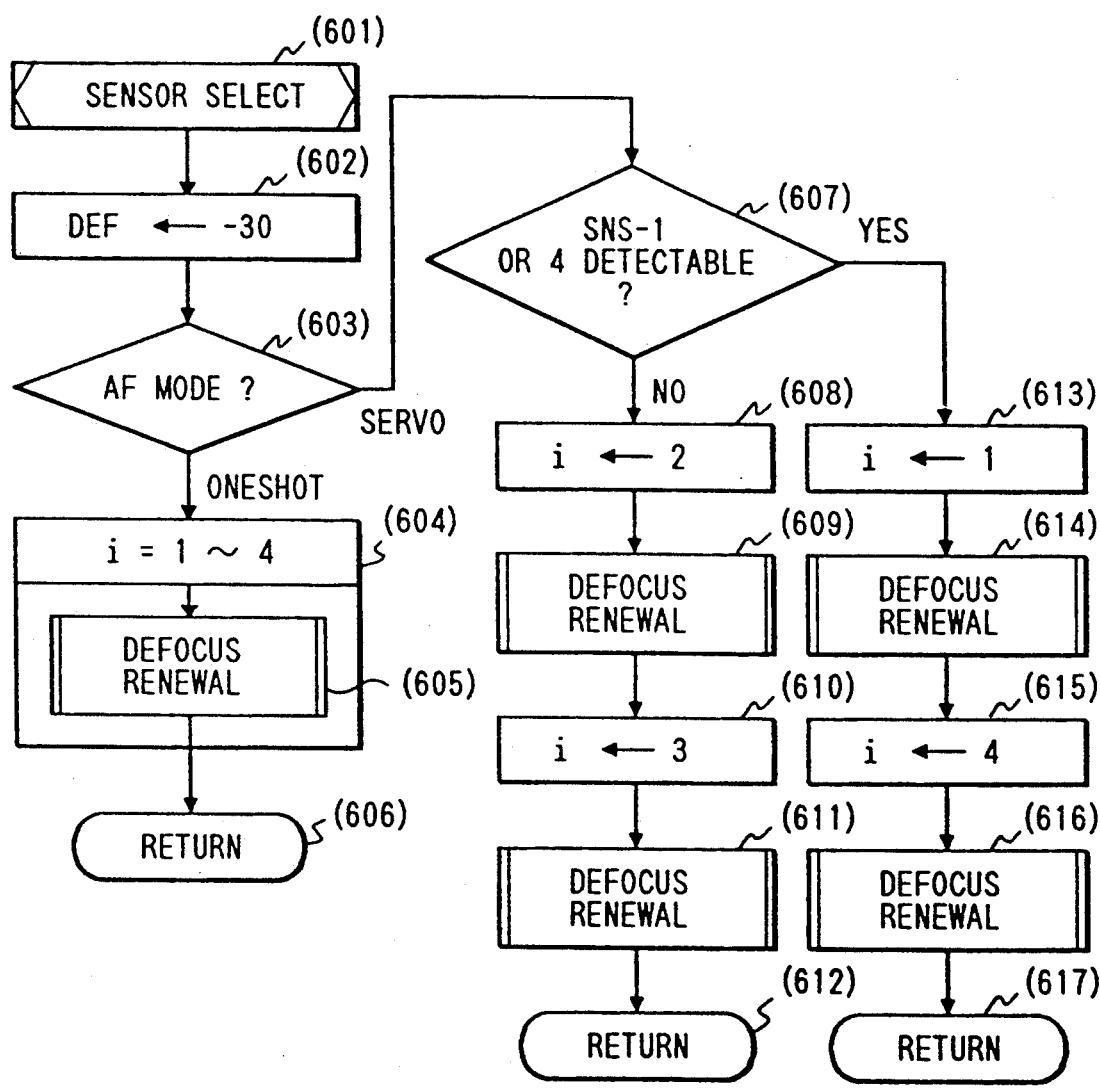

The "sensor select" subroutine is a subroutine for selecting an object area for final focus control from a plurality of detectable object areas (sensors), and the flow chart of this subroutine is shown in FIG. 4F.

When the "sensor select" subroutine is called, processing from step (602) is performed through step (601) of FIG. 4F.

In step (602), −30 (mm) is stored as an initial value in the variable DEF representing the final defocus amount. In this embodiment, when a defocus amount is positive, it represents a far-focus state. However, when a defocus amount is negative, it represents a near-focus state. Therefore, the prescribed value of −30 (mm) represents a very large near-focus defocus amount.

In step (603), the automatic focusing (AF) mode is determined. When the mode is the SERVO mode, the flow advances to step (607). However, when the mode is the ONESHOT mode, the flow advances to step (604). The AF mode is preset in accordance with a state of a camera operation member in the "AE control" subroutine in step (104) of FIG. 4A.

A case wherein the AF mode is the ONESHOT mode will be described below.

Step (604) represents loop processing for performing operations in units of four object areas (sensors). This processing is performed by updating the variable i representing the area (sensor) from 1 to 4.

A value of "1" is set in the variable i first, and the flow advances to step (605).

The "defocus renewal" subroutine is a subroutine for comparing a defocus amount of a detectable area with the final defocus amount DEF and determining a larger one as the final defocus amount. A flow chart of the "defocus renewal" subroutine is shown in FIG. 4G.

Figure 4G:
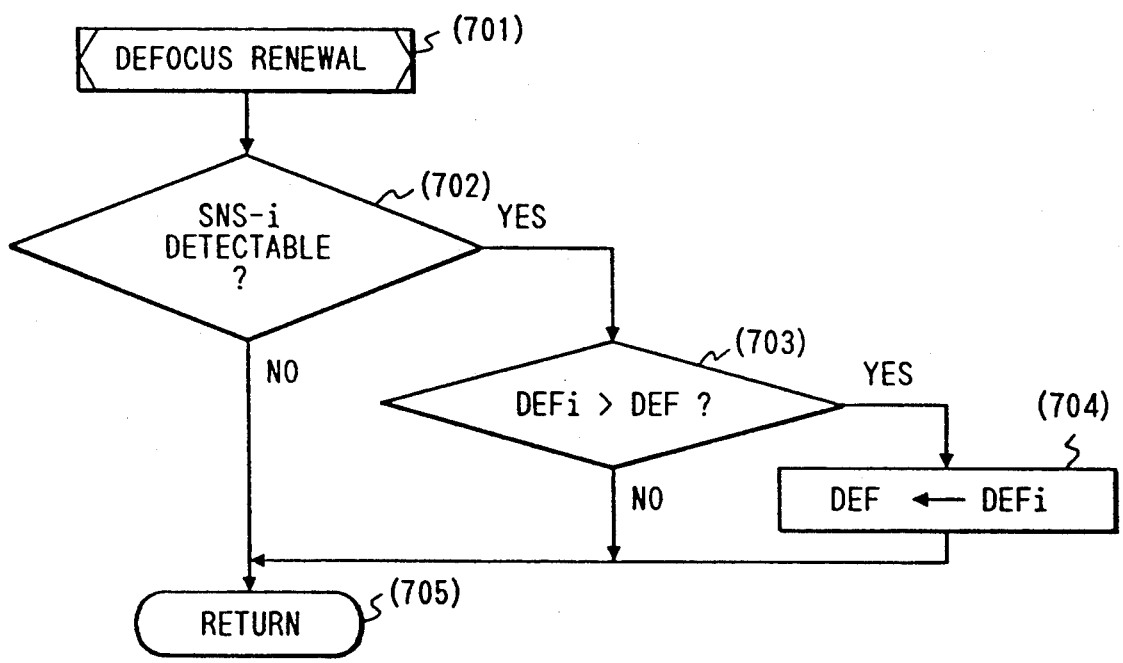

When the "defocus renewal" subroutine is called, operations from step (702) are performed through step (701) in FIG. 4G.

Since "1" is set in SNS-i, i.e., SNS-1, it is determined in step (702) whether the object area 1 is detectable. If NO in step (702), no operation is performed, and the flow advances to step (705). The "defocus renewal" subroutine is ended, and the flow returns to the main flow.

If YES in step (702), the flow advances to step (703) to compare the defocus amount DEFT of the area 1 with the final defocus amount DEF. When the DEF is larger than the DEFT, the subroutine is ended in step (705) without performing any operation. Otherwise, the flow advances to step (704).

In step (704), the defocus amount DEF1 of the area 1 is stored as the final defocus amount DEF. The "defocus renewal" subroutine is ended in step (705).

When the "defocus renewal" subroutine is ended, the flow returns to FIG. 4F. In loop processing of step (604), the variable i representing the object area is updated to 2. The "defocus renewal" subroutine in step (605) is repeated. The same operations are also performed for the variables i of 3 and 4.

When loop processing of all the object areas is completed in step (604), the flow advances to step (606), and the "sensor select" subroutine is ended.

In the ONESHOT mode, in step (604), a detectable object area having a maximum defocus amount is selected from all the detectable object areas and is set as a final defocus amount. As described above, in this embodiment, since the defocus amount is positive, it represents a far-focus state. The final defocus amount is the largest far-focus defocus amount. The largest far-focus value indicates that the object area representing this defocus amount represents the position nearest to the camera. In the ONESHOT mode, focus control of the nearest object is performed.

When it is determined in step (603) that the AF mode is the SERVO mode, the flow advances to step (607).

It is determined in step (607) whether the sensor SNS-1 or SNS-4, i.e., the object area 1 or 4 located at the center of the frame is detectable, as described with reference to FIG. 3. If YES in step (607), the flow advances to step (613). Otherwise, the flow advances to step (608).

When the object area 1 or 4 located at the center of the frame is detectable, the variable i representing the area is set to 1 in step (613). The "defocus renewal" subroutine is executed in step (614). The variable i is set to 4 in step (615), and the "defocus renewal" subroutine is performed in step (616). In step (617), the "sensor select" subroutine is ended.

By executing the operations in steps (613) to (616), a larger defocus amount of the object area 1 or 4 is stored as the final defocus amount DEF. When one of the defocus amounts of the object areas 1 and 4 is undetectable, the detectable defocus amount is stored, as a matter of course.

When both the object areas 1 and 4 are undetectable in step (607), operations from step (608) are performed. The variable i representing the object area is set to 2 in step (608), and the "defocus renewal" subroutine is executed in step (609). The variable i is set to 3 in step (610), and the "defocus renewal" subroutine is performed again in step (611). The "sensor select" subroutine is ended in step (612).

The areas 2 and 3 set in step (608) or (610) are peripheral object areas, as shown in FIG. 3.

As described above, in the SERVO mode, when an object area located at the center of the frame is detectable, the corresponding defocus amount is given as the final defocus amount. In this embodiment, since there are two central object areas 1 and 4, when both areas are detectable, the nearer area is selected as the final detectable area.

When the "sensor select" subroutine" is ended, the flow returns to step (210) of FIG. 4B.

It is determined in step (210) whether the photographic lens is set in an in-focus state on the basis of the final defocus amount. If YES in step (210), the flow advances to step (213). The "in-focus display" subroutine is executed. An in-focus display within the finder is performed. The "AF control" subroutine is ended in step (215).

If NO in step (210), the flow advances to step (211) to drive the photographic lens. In step (215), the "AF control" subroutine is ended. Lens driving is disclosed in Japanese Patent Application No. 61-160824 filed by the present assignee, and a detailed description thereof will be omitted.

In the above embodiment, the four object areas are selectively switched to one of the two AF modes (ONESHOT and SERVO). However, the number of object areas is not limited to four, and the number of AF modes is not limited to two.

In particular, the AF mode need not be set by an external camera member. The camera itself may automatically set the AF mode in accordance with an object condition (i.e., a stationary or moving object).

In the above embodiment, the nearest object is selected in the ONESHOT mode, and the central object is selected in the SERVO mode. However, a central object may be selected even in the ONESHOT mode.

In the above embodiment, a defocus amount is detected. However, a distance to each object area may be detected. In this case, a separate photographic optical system and a distance measurement optical system are additionally arranged.

What is claimed is:

1. A focus detection apparatus comprising:
   a) a detector for repeatedly performing focus detection and outputting a defocus signal upon every focus detection;

b) a processing circuit for invalidating the defocus signal when the defocus signal from said detector falls within a predetermined range; and c) a control circuit for disabling said processing circuit when a value falling outside the predetermined range is output as a defocus signal from said detector after invalidation is determined by said processing circuit.

2. A focus detection apparatus according to claim 1, wherein said processing circuit invalidates the defocus signal, which is repeatedly output from said detector, when said processing circuit determines that the defocus signal falls within the predetermined range for plural focus detections.

3. A focus detection apparatus according to claim 2, wherein said processing circuit invalidates the defocus signal when it determines that the defocus signal continuously falls within the predetermined range for plural focus detections.

4. A focus detection apparatus according to claim 1, wherein, when said control circuit receives a defocus signal falling outside the predetermined range after said processing circuit invalidated a defocus signal falling within the predetermined range, said control circuit validates the defocus signal and thereafter disables said processing circuit from invalidating a defocus signal from said detector.

5. A focus detection apparatus according to claim 2, wherein, when said control circuit receives a defocus signal falling outside the predetermined range after said processing circuit invalidated a defocus signal falling within the predetermined range, said control circuit validates the defocus signal and thereafter disables said processing circuit form invalidating a defocus signal form said detector.

6. A focus detection apparatus according to claim 3, wherein, when said control circuit receives a defocus signal falling outside the predetermined range after said processing circuit invalidated a defocus signal falling within the predetermined range, said control circuit validates the defocus signal and thereafter disables said processing circuit form invalidating a defocus signal from said detector.

* * * * *

UNITED STATES PATENT AND TRADEMARK OFFICE
CERTIFICATE OF CORRECTION

PATENT NO. : 5,311,241
DATED : May 10, 1994
INVENTOR(S) : Akira AKASHI, et al.

Page 1 of _

It is certified that error appears in the above-indentified patent and that said Letters Patent is hereby corrected as shown below:

ON THE COVER PAGE:

Item: [62] Under the Heading "RELATED U.S. APPLICATION DATA
   Line 1, "Ser. No. 641,508" should read --Ser. No. 641,509,--.

AT [57] Under the Heading "ABSTRACT":
   Line 10, "form" should read --from--; and
   Line 16, "represent" should read --represents--.

IN THE DRAWINGS:
   In FIG. 1, in the block shown as 003, "DETECTBLE" should read --DETECTABLE--.

COLUMN 1:
   Line 14, "lens and," should read --lens, and--; and
   Line 32, "In" should read starting a new paragraph --In- COLUMN 2:
   Line 57, "another" should read --a further--.

COLUMN 4:
   Line 52, "lo" should be deleted.

COLUMN 5:
   Line 1, "signal So" should read --signal SO--;
   Line 14, "ONIOFF" should read --ON/OFF--;
   Line 39, "ON the" should read --the ON--;
   Line 43, "motor MTRL" should read --motor MTR1--; and
   Line 44, "char e" should read --charge--.

UNITED STATES PATENT AND TRADEMARK OFFICE
CERTIFICATE OF CORRECTION

PATENT NO. : 5,311,241
DATED : May 10, 1994
INVENTOR(S) : Akira AKASHI, et al.

It is certified that error appears in the above-indentified patent and that said Letters Patent is hereby corrected as shown below:

COLUMN 6:
    Line 5, "motor LTMR" should read --motor LMTR--.

COLUMN 8:
    Line 66, "Patent," should read --Patent--.

COLUMN 9:
    Line 66, "amount DEFT" should read --amount DEF1--.

COLUMN 10:
    Line 7, "sensor SNS-I," should read --sensor SNS-i,--; and
    Line 14, "area I" should read --area 1--.

COLUMN 11:
    Line 50, "DISI flag," should read --DISi flag,--.

COLUMN 13:
    Line 33, "amount DEFT" should read --amount DEF1--; and
    Line 35, "DEFT," should read "DEF1,".

UNITED STATES PATENT AND TRADEMARK OFFICE
CERTIFICATE OF CORRECTION

PATENT NO. : 5,311,241
DATED : May 10, 1994
INVENTOR(S) : Akira AKASHI, et al.

It is certified that error appears in the above-indentified patent and that said Letters Patent is hereby corrected as shown below:

COLUMN 16:
    Line 12, "form" should read --from--;
    Line 13, "form" should read --from--; and
    Line 20, "form" should read --from--.

Signed and Sealed this

Twenty-second Day of November, 1994

BRUCE LEHMAN

Attest:

Attesting Officer     Commissioner of Patents and Trademarks